United States Patent
Takahashi et al.

(10) Patent No.: US 11,302,480 B2
(45) Date of Patent: Apr. 12, 2022

(54) CERAMIC ELECTRONIC DEVICE WITH VARYING ROUGHNESS TERMINAL ELECTRODE

(71) Applicant: TDK CORPORATION, Tokyo (JP)

(72) Inventors: Tetsuhiro Takahashi, Tokyo (JP); Tomohisa Fukuoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/932,298

(22) Filed: Jul. 17, 2020

(65) Prior Publication Data

US 2021/0027945 A1 Jan. 28, 2021

(30) Foreign Application Priority Data

Jul. 22, 2019 (JP) .............................. JP2019-134685

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 5,805,409 A * | 9/1998 | Takahara | H01G 4/2325 361/303 |
| 10,825,611 B1 * | 11/2020 | Fukuoka | H01G 4/012 |
| 2001/0043454 A1 * | 11/2001 | Yoshii | H01G 4/232 361/321.2 |
| 2001/0055192 A1 * | 12/2001 | Nakano | H01G 4/30 361/306.3 |
| 2002/0046861 A1 * | 4/2002 | Yokoyama | H01G 4/232 174/565 |
| 2006/0028788 A1 | 2/2006 | Sridharan et al. | |
| 2007/0030628 A1 * | 2/2007 | Yamamoto | H05K 1/185 361/311 |

(Continued)

FOREIGN PATENT DOCUMENTS

| | | | | |
|---|---|---|---|---|
| CN | 1308342 A | * | 8/2001 | ............... H01B 1/16 |
| CN | 1741212 A | * | 3/2006 | ......... C04B 35/4682 |

(Continued)

*Primary Examiner* — Timothy J. Dole
*Assistant Examiner* — Muhammed Azam
(74) *Attorney, Agent, or Firm* — Oliff PLC

(57) ABSTRACT

A ceramic electronic device including a ceramic body having ceramic layers and internal electrode layers stacked in alternating manner and a terminal electrode formed at an end face of the ceramic body. The terminal electrode includes a base electrode including a metal component and a glass component, an intermediate electrode layer including Ni and formed at an outer face of the base electrode layer, and an upper electrode layer including Pd or Au and formed at an outer face of the intermediate electrode layer. Also, a surface roughness Ra1 of the base electrode layer in the terminal electrode is 5.0 μm or less; or the surface roughness Ra1 of the base electrode layer, a surface roughness Ra2 of the intermediate electrode layer, and a surface roughness Ra3 of the upper electrode layer satisfy a relationship of Ra1>Ra3≥Ra2.

10 Claims, 4 Drawing Sheets

(56) References Cited

U.S. PATENT DOCUMENTS

| | | | | |
|---|---|---|---|---|
| 2007/0045814 A1* | 3/2007 | Yamamoto | ........ | H01L 23/49822 257/698 |
| 2011/0122540 A1* | 5/2011 | Ogawa | ................ | H01G 4/2325 361/305 |
| 2011/0235233 A1* | 9/2011 | Ando | ...................... | C04B 35/49 361/301.4 |
| 2012/0057268 A1* | 3/2012 | Tsutsumi | ............... | H01G 4/232 361/301.4 |
| 2012/0147514 A1* | 6/2012 | Suh | ....................... | C04B 35/632 361/301.4 |
| 2013/0208401 A1* | 8/2013 | Shirakawa | ............. | H01G 4/008 361/305 |
| 2014/0151101 A1* | 6/2014 | Lee | .......................... | H01G 4/12 174/260 |
| 2014/0182907 A1* | 7/2014 | Lee | .......................... | H01G 4/30 174/258 |
| 2015/0001998 A1* | 1/2015 | Katsuta | ................. | H01G 4/232 310/366 |
| 2015/0021079 A1* | 1/2015 | Lee | ....................... | H01G 4/012 174/260 |
| 2015/0075853 A1* | 3/2015 | Lee | ....................... | H01G 4/232 174/260 |
| 2015/0109718 A1* | 4/2015 | Choi | ....................... | H01G 4/12 361/304 |
| 2016/0276104 A1* | 9/2016 | Nishisaka | ............ | H01G 13/006 |
| 2016/0284475 A1* | 9/2016 | Onoue | ................... | H01G 4/30 |
| 2017/0032896 A1* | 2/2017 | Otani | ..................... | H01G 4/232 |
| 2017/0222117 A1* | 8/2017 | Katsuta | ................. | H01F 27/245 |
| 2017/0309402 A1* | 10/2017 | Yamashita | .......... | H01F 17/0013 |
| 2018/0082787 A1* | 3/2018 | Hamamori | ............. | H01G 4/005 |
| 2018/0090274 A1* | 3/2018 | Ito | .......................... | H01G 4/30 |
| 2018/0090276 A1* | 3/2018 | Ito | .......................... | H01G 4/232 |
| 2018/0102219 A1* | 4/2018 | Kumagae | ............. | H01G 4/224 |
| 2018/0166215 A1* | 6/2018 | Hamanaka | ............. | H01G 4/232 |
| 2018/0286583 A1* | 10/2018 | Onoue | ................... | H01G 4/232 |
| 2019/0098761 A1* | 3/2019 | Yoshida | ................. | H01C 7/008 |
| 2019/0267330 A1* | 8/2019 | Takizawa | ................. | H01G 4/30 |
| 2020/0312563 A1* | 10/2020 | Nagai | .................... | H01G 4/232 |
| 2020/0312564 A1* | 10/2020 | Onishi | ................. | H01G 4/2325 |
| 2020/0312565 A1* | 10/2020 | Kanzaki | ................. | H01G 4/232 |
| 2021/0027945 A1* | 1/2021 | Takahashi | ............ | H01G 4/2325 |
| 2021/0366654 A1* | 11/2021 | Iguchi | ................... | H01G 4/008 |

FOREIGN PATENT DOCUMENTS

| | | | | | |
|---|---|---|---|---|---|
| CN | 1768017 | A | * | 5/2006 | ............... H01G 4/30 |
| CN | 1768403 | A | * | 5/2006 | ............... H01G 4/20 |
| CN | 1781169 | A | * | 5/2006 | ............... H01G 4/30 |
| CN | 1812024 | A | * | 8/2006 | ........... C04B 35/632 |
| CN | 1822263 | A | * | 8/2006 | ........... H01G 4/2325 |
| CN | 1886807 | A | * | 12/2006 | ........... H01G 4/0085 |
| CN | 101238531 | A | | 8/2008 | |
| CN | 104252968 | A | * | 12/2014 | ............... H01G 4/12 |
| CN | 104576046 | A | * | 4/2015 | ............. H01G 4/306 |
| CN | 104576050 | A | * | 4/2015 | |
| EP | 0966006 | A2 | * | 12/1999 | ............... H01G 4/30 |
| JP | H07-022268 | A | | 1/1995 | |
| JP | 2005158563 | A | * | 6/2005 | ............... H01G 4/12 |
| JP | 2005243560 | A | * | 9/2005 | ......... C04B 35/4682 |
| JP | 2014110417 | A | * | 6/2014 | ............... H01G 4/12 |
| JP | 2015-029050 | A | | 2/2015 | |
| KR | 20020008785 | A | * | 1/2002 | ........... C03C 14/004 |
| KR | 20020053748 | A | * | 7/2002 | ............. B32B 18/00 |
| KR | 100664979 | B1 | * | 1/2007 | |
| KR | 101153550 | B1 | * | 6/2012 | |
| KR | 20150019282 | A | * | 2/2015 | |
| KR | 20170076336 | A | * | 7/2017 | |
| KR | 20180035169 | A | * | 4/2018 | |
| WO | WO-2005036571 | A1 | * | 4/2005 | ............... H01G 4/30 |
| WO | WO-2005043568 | A1 | * | 5/2005 | ............... H01G 4/012 |
| WO | WO-2005052954 | A1 | * | 6/2005 | ............. C09D 129/14 |
| WO | WO-2006090551 | A1 | * | 8/2006 | ............... H01G 4/08 |
| WO | WO-2009098938 | A1 | * | 8/2009 | ............... H01B 1/22 |
| WO | WO-2019188095 | A1 | * | 10/2019 | ............... H01B 1/20 |

* cited by examiner

CERAMIC ELECTRONIC DEVICE WITH VARYING ROUGHNESS TERMINAL ELECTRODE

TECHNICAL FIELD

The present invention relates to a ceramic electronic device formed with an external electrode.

BACKGROUND

Many electronic devices such as ceramic electronic devices are mounted inside an electronic apparatus.

Conventionally, in order to mount these electronic devices, a lead-free solder of Sn—Ag—Cu based, and a conductive adhesive agent added with conductive fine particles such as a metal filler and the like to a heat curable resin such as an epoxy resin and the like are used as a bonding material. The bonding material is selected mainly depending on environment to be used.

In recent years, the environment in which an inverter circuits using SiC power semiconductor is used is expected to become higher than 150° C. Thus, for such circuit substrate, mounting technology capable of maintaining a stable bonding force (that is, high mounting reliability) is demanded even when thermal stress is applied. In response to such demands, as a bonding material, a high temperature solder such as Au—Ge, Au—Sn, and the like, a conductive adhesive agent with improved heat resistance, and the like are developed. Note that, in order to ensure the mounting reliability, the electronic components which is the object to be bonded needs to be optimized in addition to the optimization of the bonding material.

As the external electrode of the ceramic electronic device corresponding to the conductive adhesive agent, Patent Document 1 discloses technology of forming an intermediate electrode layer made of Ni plating and an upper electrode layer made of Pd or Pd—Ni alloy on a base electrode layer. Further, Patent Document 1 discloses that by regulating a thickness of Ni as the intermediate electrode layer by a predetermined condition, Ag is prevented from migrating, and the conductive adhesive agent is suppressed from oozing out and also suppressed from causing short circuit between the external electrodes during mounting. Thereby, Patent Document 1 describes that a heat shock resistance against the heat stress of 150° C. or so can be satisfied.

However, the technology disclosed in Patent Document 1 had a possibility that the heat shock resistance and a highly accelerated lifetime cannot be satisfied when harsh heat stress such as 200° C. or so is applied.

[Patent Document 1] JP Patent Application Laid Open No. 2015-29050

SUMMARY

The present invention is achieved in view of such circumstances, and the object is to provide a ceramic electronic device capable of ensuring a mounting reliability even when heat stress is applied.

In order to attain the above object, a multilayer electronic component according to the first aspect of the present invention includes a ceramic body having ceramic layers and internal electrode layers stacked in alternating manner and a terminal electrode formed at an end face of the ceramic body;

wherein the terminal electrode includes a base electrode layer formed so to electrically connect with the internal electrode layers, an intermediate electrode layer formed at an outer side of the base electrode layer, and an upper electrode layer formed at an outer side of the intermediate electrode layer;

the base electrode layer includes a metal component and a glass component;

the intermediate electrode layer includes Ni;

the upper electrode layer includes Pd or Au; and a surface roughness Ra1 of the base electrode layer in the terminal electrode is 5.0 µm or less.

In the terminal electrode having a multilayer structure as mentioned in above, by regulating the surface roughness Ra1 of the base electrode layer to 5.0 µm or less, defect such as pinhole and the like at the intermediate electrode layer can be reduced, thus a smooth intermediate electrode layer is easily obtained. As a result, in the ceramic electronic device according to the first aspect of the present invention, even when the ceramic electronic device is exposed under high temperature condition such as 200° C. or so for a long period of time after mounting using the bonding material, an insulation resistance scarcely decreases. That is, the ceramic electronic device according to the first aspect of the present invention can improve a highly accelerated lifetime than the conventional technology and the mounting reliability is improved.

Also, in order to attain the above object, a ceramic electronic device according to the second aspect of the present invention includes a ceramic body having ceramic layers and internal electrode layers stacked in alternating manner and a terminal electrode formed at an end face of the ceramic body;

wherein the terminal electrode comprises a base electrode layer formed so to electrically connect with the internal electrode layers, an intermediate electrode layer formed at an outer side of the base electrode layer, and an upper electrode layer formed at an outer side of the intermediate electrode layer;

the base electrode layer includes a metal component and a glass component;

the intermediate electrode layer includes Ni;

the upper electrode layer includes Pd or Au; and the surface roughness Ra1 of the base electrode layer, a surface roughness Ra2 of the intermediate electrode layer, and a surface roughness Ra3 of the upper electrode layer satisfy a relationship of Ra1>Ra3≥Ra2

In the terminal electrode having the multilayer structure as mentioned in above, by roughening the surface of the upper electrode layer to provide a surface roughness of each layer to satisfy the relationship of Ra1>Ra3≥Ra2, tensile stress acting on the upper electrode layer from the intermediate electrode layer can be reduced. As a result, the ceramic electronic device according to the second aspect of the present invention can suppress a crack to the upper electrode layer even when a plurality of times of heat shocks of −55° C. to 200° C. is applied after mounted using the bonding material. Also, even if a crack is formed, the crack is suppressed from progressing. That is, the ceramic electronic device according to the second aspect of the present invention can improve the heat shock resistance compared to the conventional technology and can improve the mounting reliability.

Also, when the ceramic electronic device includes both of the first and second aspects of the present invention, that is the surface roughness Ra1 of the base electrode layer is 5.0 µm or less and a surface roughness of each layer satisfies a relationship of Ra1>Ra3≥Ra2, then a good highly accelerated lifetime and a good heat shock resistance can be both attained, and the mounting reliability further improves.

Note that, preferably the thickness of the upper electrode layer is 1.0 µm or less. In the present invention, by making the thickness of the upper electrode layer to 1.0 µm or less, a cost for raw materials can be reduced and the mounting reliability can be further improved.

As the glass component included in the base electrode layer, zinc oxide (ZnO), boron oxide ($B_2O_3$), silicon oxide ($SiO_2$), and aluminum oxide ($Al_2O_3$) can be included. By including these glass compounds, a dense base electrode layer can be easily obtained.

Also, in case of including the above-mentioned glass compounds, a ratio of content of zinc oxide with respect to a sum of contents of boron oxide, silicon oxide, and aluminum oxide ($ZnO/(B_2O_3+SiO_2+Al_2O_3)$) is preferably 0.25 to 0.32 when the glass component as a whole is 100 mol. In addition, a ratio of content of boron oxide with respect to a sum of contents of silicon oxide and aluminum oxide ($(B_2O_3/(SiO_2+Al_2O_3))$) is preferably 0.60 to 0.70 when the glass component as a whole is 100 mol.

As mentioned in above, by including a predetermined compound by a predetermined content ratio as the glass component in the base electrode layer, smoother surface of the intermediate electrode layer can be attained. As a result, the highly accelerated lifetime and the heat shock resistance can be enhanced even more, and the mounting reliability can be improved even more.

Also, preferably, in the surface of the upper electrode layer, the content ratio of Ni is 5.0 wt % or less. As such, when exposure of Ni is little around the surface of the upper electrode layer, decrease of the bonding strength caused by oxidation of Ni component can be suppressed. As a result, the highly accelerated lifetime and the heat shock resistance can be enhanced even more, and the mounting reliability can be improved even more.

DETAILED DESCRIPTION

Hereinbelow, the present invention is described based on embodiments shown in figures, however the present invention is not limited thereto.

Figure 1:
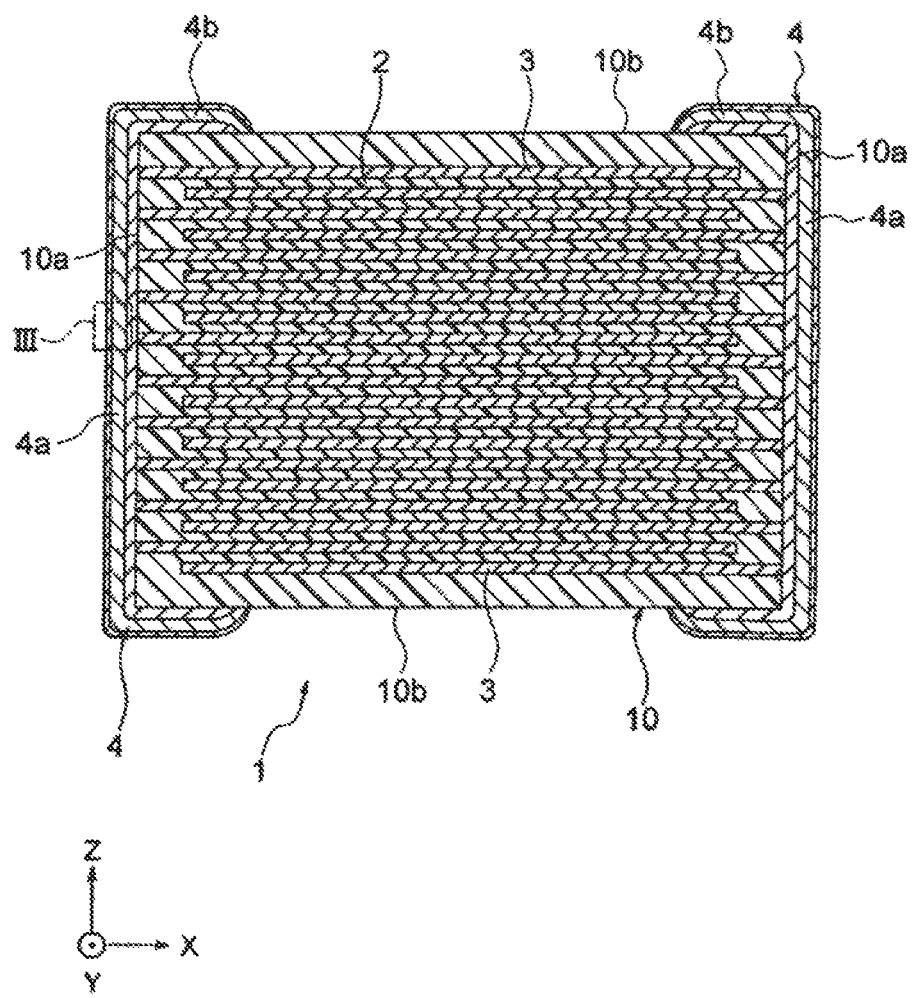
FIG. 1 shows a cross section of a multilayer ceramic capacitor according to one embodiment of the present invention.

As shown in FIG. 1, a multilayer ceramic capacitor 1 according to the present embodiment has a ceramic body 10 including ceramic layers 2 and internal electrode layers 3 substantially parallel to a plane including X axis and Y axis. The ceramic layers 2 and the internal electrode layers 3 are stacked along Z axis in alternating manner in the ceramic body 10.

Here, "substantially parallel" means that most parts are parallel, and it also means that there may be part which are not necessarily parallel. That is, the ceramic layers 2 and the internal electrode layers 3 may have some roughness or may be slanted.

A shape of the ceramic body 10 shown in FIG. 1 is a rectangular parallelepiped shape. The ceramic body 10 includes two end faces 10a facing across X axis, two side faces 10b facing across Y axis, and two side faces 10b facing across Z axis. Note that, the shape of the ceramic body 10 is not particularly limited, and it may be an oval column shape, a circular column shape, other prismatic column shape, and the like. Also, an external dimension of the ceramic body 10 is not particularly limited, for example, a length along X axis can be 1.0 mm to 5.7 mm, a width along Y axis is 0.5 mm to 5.0 mm, and a height along Z axis is 0.5 mm to 3.0 mm.

FIG. 1 shows an embodiment of the multilayer ceramic capacitor 1, thus the ceramic layers 2 stacked in the ceramic body 10 are constituted by dielectric ceramics. The material of the ceramic layers 2 is not particularly limited, for example dielectric ceramics such as $BaTiO_3$, $CaTiO_3$, $SrTiO_3$, $CaZrO_3$, $(K_{1-x}Na_x)Sr_2Nb_5O_{15}$, $Ba_3TiNb_4O_{15}$, $(K_{1-x}Na_x)NbO_3$, and the like are used as a main component. Also, other than these main components, a sub component such as Mn compound, Mg compound, Cr compound, Co compound, Ni compound, a compound of rare earth element, Si compound, Li compound, V compound, and the like may be included.

A thickness of the ceramic layer 2 is not particularly limited, and it can be 0.5 µm to 10 µm per each layer. Also, a number of stacked ceramic layers 2 is not particularly limited and it may be determined depending on desired properties. For example, preferably it can be 20 or more and more preferably 50 or more.

On the other hand, the internal electrode layers 3 are stacked between the ceramic layers 2, and a number of stacked internal electrode layers 3 is determined depending on the number of stacked ceramic layers 2. Also, a thickness of the internal electrode layer 3 is not particularly and for example it can be 0.5 µm to 3.0 µm.

Further, the internal electrode layers 3 are stacked so that each end exposes alternatingly to the two end faces 10a facing across X axis of the ceramic body 10. Also, a pair of external electrodes 4 are formed to both end faces 10a of the ceramic body 10 and electrically connects with exposed ends of the internal electrode layers 3 placed in alternating manner. By forming the external electrodes 4 as such, the external electrodes 4 and the internal electrode layers 3 constitutes a capacitor circuit.

That is, the internal electrode layers 3 as a part of the capacitor circuit functions to apply voltage to each ceramic layer 2. Therefore, a material of the internal electrode layer 3 includes a conductive material. As a specific material, for example, Cu, Ni, Ag, Pd, Au, and Pt can be used, and also an alloy including at least one metal element selected from these can be used. More preferably, the conductive material included in the internal electrode layer 3 is Ni or Ni based alloy since the constituting material of the ceramic layer 2 has a reduction resistance. Also, in case Ni or Ni based alloy is the main component, at least one sub component for internal electrode selected from Al, Si, Li, Cr, and Fe may be included.

Note that, the internal electrode layer 3 may include a ceramic component included in the ceramic layer 2 as an inhibitor, and also a trace amount of a non-metal component such as P and the like may be included.

As shown in FIG. 1, the external electrode 4 of the present embodiment includes an external electrode end part 4a (terminal electrode) formed to both end faces 10a along X axis of the ceramic body 10, and an external electrode extension part 4b integrally formed with the external electrode end part 4a and formed at both ends along X axis to four side faces 10b of the ceramic body 10. That is, the pair of external electrodes 4 is formed so that each external electrode 4 wraps around the side face 10b from the end face 10a of the ceramic body 10. Also, the pair of external electrodes 4 is insulated so that each external electrode 4 does not contact with each other along X axis.

As mentioned in above, in the present embodiment, the external electrode extension part 4b is formed to each of four side faces 4b of the ceramic body 10. Note that, the external electrode extension part 4b may be at least formed to a side closer to a mounting face (that is, a mounting substrate side, a lower face along Z axis) and it does not necessarily have to be formed to the side face 10b which is opposite of the mounting face (upper face along Z axis).

Figure 2:
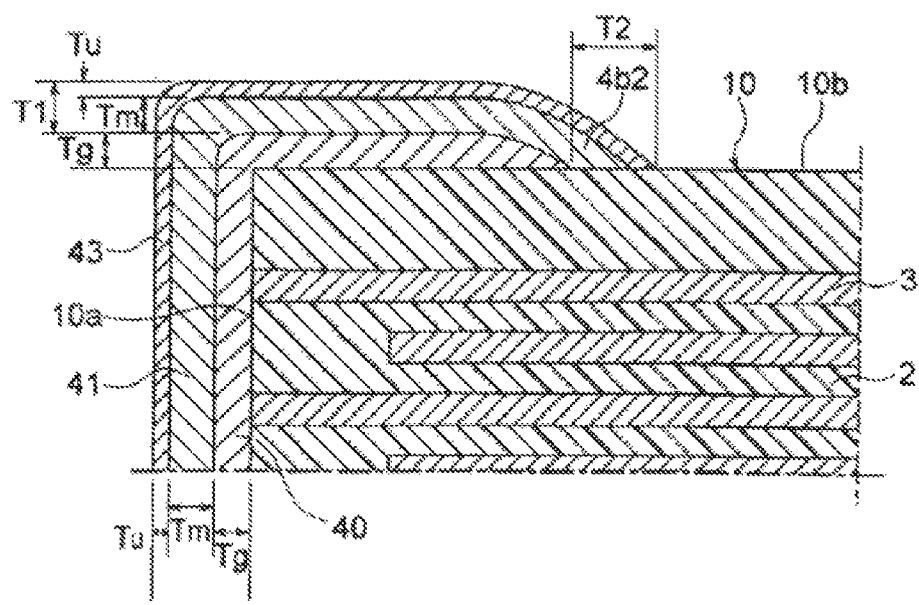
FIG. 2 shows a cross section of an external electrode of the multilayer ceramic capacitor according to one embodiment of the present invention.
Figure 2:
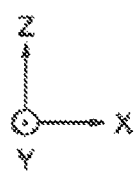

Also, as shown in FIG. 2, the external electrode 4 of the present embodiment has a multilayer structure including a base electrode layer 40, an intermediate electrode layer 41, and an upper electrode layer 43. The base electrode layer 40 is directly formed to the end face 10a of the ceramic body 10 so to electrically connect with the exposed end of the internal electrode layer 3. The intermediate electrode layer 41 is formed on an outer side of the base electrode layer 40 and the upper electrode layer 43 is formed on an outer side of the intermediate electrode layer 41. Note that, FIG. 2 shows one external electrode 4 of the pair of external electrodes 4 and the other external electrode 4 has the same constitution.

The base electrode layer 40 includes the glass component and the metal component having conductivity. As the metal component included in the base electrode layer 40, Cu, Ag, Pd, Au, Ni, or an alloy including at least one metal element selected from these can be used. Preferably, the metal component may be Cu.

Also, the glass component included in the base electrode layer 40 preferably includes zinc oxide (ZnO), boron oxide ($B_2O_3$), silicon oxide ($SiO_2$), and aluminum oxide ($Al_2O_3$) as a main component. Also, besides the above-mentioned glass compounds, a sub component such as strontium oxide (SrO), magnesium oxide (MgO), barium oxide (BaO), vanadium oxide ($V_2O_5$), calcium oxide (CaO), titanium oxide ($TiO_2$), and the like can be included. A content of the sub component is preferably 1.0 to 20 parts by mol with respect to the glass component as a whole.

Note that, a glass component included in the base electrode layer 40 preferably includes the above-mentioned glass compounds in a predetermined ratio. Particularly, a content ratio of zinc oxide is preferably 0.25 to 0.32 with respect to a sum of content ratios of boron oxide, silicon oxide, and aluminum oxide ($ZnO/(B_2O_3+SiO_2+Al_2O_3)$) when the glass component as a whole is 100 parts by mol. Also, a content ratio of boron oxide is preferably 0.60 to 0.70 with respect to a sum of content ratios of silicon oxide and aluminum oxide ($B_2O_3/(SiO_2+Al_2O_3)$) when the glass component as a whole is 100 parts by mol.

A thickness Tg of the base electrode layer 40 can be 2.5 μm to 50 μm and preferably it is 5 μm to 25 μm. Also, the thickness Tg of the base electrode layer 40 may be about the same or different between the external electrode end part 4a and the external electrode extension part 4b.

The intermediate electrode layer 41 includes Ni, and it may be pure Ni or Ni alloy. Also, the intermediate electrode layer 41 can include boron (B) and phosphorous (P). By forming the intermediate electrode layer 41 including Ni, a coating property of the upper electrode layer on the intermediate electrode layer can be enhanced. Also, in case of forming the upper electrode layer 43 by plating, upon immersing in a plating solution to form the upper electrode layer 43, by having the intermediate electrode layer 41, the base electrode layer 40 is prevented from dissolving into the plating solution.

Note that, a thickness Tm of the intermediate electrode layer 41 can be 2.0 μm to 35 μm and preferably it is 3 μm to 20 μm. Also, the thickness Tm of the intermediate electrode layer 41 may be about the same or different between the external electrode end part 4a and the external electrode extension part 4b. More preferably, a maximum value of the thickness Tm of the intermediate electrode layer 41 at the external electrode extension part 4b is 0.75 times or more and less than 1.00 times of a maximum value of the thickness Tm of the intermediate electrode layer 41 at the external electrode end part 4a.

The upper electrode layer 43 includes an element having higher standard electrode potential than Cu. As the element having higher standard electrode potential than Cu, a precious metal element which is thermally and chemically stable may be mentioned and specifically Pd or Au is preferably included. By referring "Pd or Au is included", it means that it may be pure Pd or pure Au, or an alloy including at least one of Pd or Au may be included (for example, Pd—Ni alloy, Au—Ni alloy, Au—Pd alloy, Au—Pd—Ni alloy, and the like).

As such, since the main component of the upper electrode layer 43 is not base metals such as Sn and the like but rather precious metals having high standard electrode potential, galvanic corrosion and oxidation deterioration at the mounting part can be suppressed, and a reliability of electric bonding with a bonding material such as a conductive adhesive agent and the like can be ensured. Note that, preferably the upper electrode layer 43 does not include Ag or includes Ag in a ratio of 10 wt % or less. By regulating a content of Ag in the upper electrode layer 43 to a predetermined amount or less, ion migration can be prevented.

Also, at the surface of the upper electrode layer 43, the intermediate electrode layer 41 which is positioned at the inner side of the upper electrode layer 43 is preferably not exposed. Alternatively, a content ratio of Ni is preferably 5.0 wt % or less at an area of 200 nm or so along the depth direction from the outer most surface of the upper electrode layer 43.

Further, a thickness Tu of the upper electrode layer 43 can be 3.0 μm or less and preferably 1.0 μm or less. A lower limit of the thickness Tu of the upper electrode layer 43 is preferably a thickness which does not expose the intermediate electrode layer 41 to the surface. Specifically, the lower limit of the thickness Tu is not particularly limited, and preferably it is 0.1 μm or more and more preferably 0.2 μm or more. The thickness Tu of the upper electrode layer 43 may be about the same or different between the external electrode end part 4a and the external electrode extension part 4b.

As shown in FIG. 2, at an end of the external electrode extension part 4b, the intermediate electrode layer 41 and the upper electrode layer 43 extend longer along X axis than the base electrode layer 40, thereby an elongated part 4b2 is formed. In other words, an end of the base electrode layer 40 is covered by the intermediate electrode layer 41 and the upper electrode layer 43. A length T2 of this elongated part 4b2 is not particularly limited. Preferably, the length T2 is longer than a sum (T1) of the thickness Tm of the intermediate electrode layer 41 and the thickness Tu of the upper electrode layer 43 of the external electrode extension part 4b (T2>T1). More preferably, T2/T1 is 1.20 or more and 4.50 or less.

As such, by having a predetermined length of the elongated part 4b2, the metal component included in the base electrode layer 40 can be suppressed from diffusing to the bonding material such as the conductive adhesive agent and the like after mounted on the substrate. As a result, copper damage and galvanic corrosion can be effectively suppressed and the bonding reliability after mounting on the substrate can be maintained.

Figure 3:
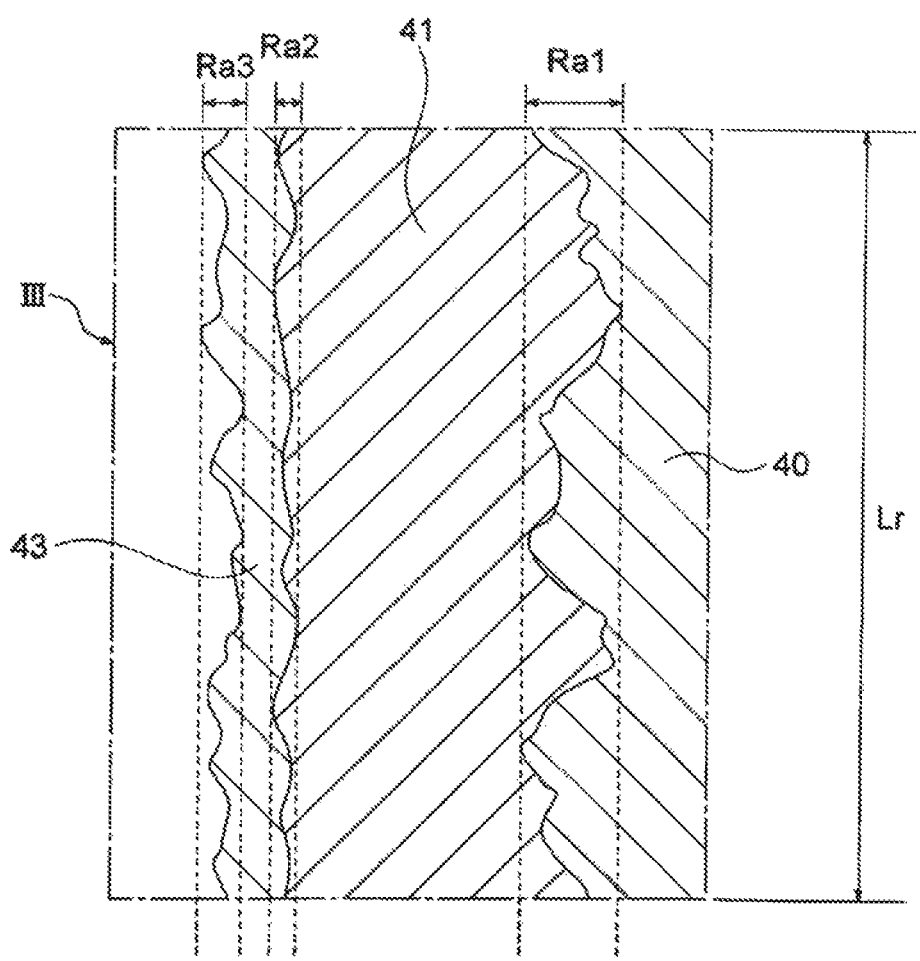
FIG. 3 shows an enlarged schematic cross section of an area III (terminal electrode part) shown in FIG. 1.

Also, FIG. 3 is an image of the schematic cross section observing by enlarging an area III shown in FIG. 1. In the present embodiment, as shown in FIG. 3, the base electrode layer 40, the intermediate electrode layer 41, and the upper electrode layer 43 are formed at the external electrode part 4a while having a predetermined surface roughness Ra1, Ra2, and Ra3. Specifically, the surface roughness Ra1 of the base electrode layer 40 can be 0.8 μm to 7.0 μm, preferably 0.8 μm to 5.0 μm, and more preferably 0.8 μm to 4.5 μm. The surface roughness Ra2 of the intermediate electrode layer 41 is preferably 0.2 μm to 2.5 μm, and more preferably 0.2 μm to 1.3 μm. Further, the surface roughness Ra3 of the upper electrode layer 43 is preferably 0.2 μm to 3.0 μm and more preferably 0.3 μm to 1.7 μm.

Also, the relationship between the surface roughness Ra1 of the base electrode layer 40 and the surface roughness Ra2 of the intermediate electrode layer 41 is Ra1>Ra2. In this case, a ratio of Ra1 with respect to Ra2 (Ra1/Ra2) is preferably 2.0 to 6.0 and more preferably 4.0 to 6.0.

A relationship between the surface roughness Ra2 of the intermediate electrode layer 41 and the surface roughness Ra3 of the upper electrode layer 43 is preferably Ra3>Ra2. Note that, in case Ra2 and Ra3 are both 1.0 μm or less, Ra3 Ra2 may be satisfied. In case of Ra3≥Ra2, a ratio of Ra3 with respect to Ra2 (Ra3/Ra2) is preferably 1.0 to 1.6 and more preferably 1.0 to 1.4.

Further, a relationship between the surface roughness Ra1 of the base electrode layer 40 and the surface roughness Ra3 of the upper electrode layer 43 is Ra1>Ra3. In this case, the ratio of Ra1 with respect to Ra3 (Ra1/Ra3) is preferably 3.0 to 6.0 and more preferably 3.0 to 5.0.

Overall, the surface roughness Ra1, Ra2, and Ra3 of each layer 40, 41, and 43 in the external electrode end part 4a satisfies Ra1>Ra3≥Ra2 and more preferably Ra1>Ra3>Ra2. Note that, the surface roughness of each layer 40, 41, and 43 in the external electrode extension part 4b is not particularly limited and it may be same as in case of the external electrode end part 4a.

Although it is described in detail in below, by regulating the surface roughness Ra1, Ra2, and Ra3 of each layer 40, 41, and 43 within predetermined ranges mentioned above, the heat shock resistance and the highly accelerated lifetime can be improved and the mounting reliability when heat stress is applied after mounting to the substrate can be ensured.

Note that, the surface roughness of each electrode layer 40, 41, and 43 mentioned in above can be measured by observing the cross section using an optical microscope, a scanning electron microscope (SEM), and the like. Specifically, the multilayer ceramic capacitor 1 according to the present embodiment is embedded in a resin and then cut. This cross section is mirror polished and a sample for cross section observation is prepared. Then, a part of the external electrode end part 4a (that is, the area III shown in FIG. 1) is observed under a predetermined magnification, then an image of the cross section is taken.

As shown in FIG. 3, for example, in case of measuring the surface roughness Ra1 of the base electrode layer 40, in the cross section image, a boundary between the base electrode layer 40 and the intermediate electrode layer 41 is taken out as a roughness curve, and an arithmetic average roughness at a reference length Lr (preferably, Lr=50 μm) is measured by an image analysis. The surface roughness Ra2 of the intermediate electrode layer 41 and the surface roughness Ra3 of the upper electrode layer 43 are measured using the cross-section image and by image analysis as similar to the base electrode layer 40. Note that, although it is not shown in FIG. 3, the roughness curve taken for the measurement of the surface roughness Ra may be somewhat curved. That is, it may be a waviness curve. When waviness exists at the surface, the arithmetic average roughness Ra may be calculated by adjusting the surface waviness during image analysis.

Next, one example of a method of production of the multilayer ceramic capacitor 1 shown in FIG. 1 is described.

First, production steps of the ceramic body 10 is described. In the production steps of the ceramic body 10, a dielectric paste which becomes the ceramic layer 2 after firing and a conductive paste which becomes the internal electrode layer 3 after firing are prepared.

The dielectric paste is produced for example by a method described in below. For example, dielectric materials are uniformly mixed by a means such as wet mixing and the like and dried. Then, by heat treating under a predetermined condition, a calcined powder is obtained. Next, a known organic vehicle or a known water-based vehicle is added to the obtained calcined powder and kneaded, thereby a dielectric paste is prepared. The dielectric paste obtained as such is made into a sheet form, thereby a ceramic green sheet is obtained.

The conductive paste is prepared by kneading fine particles made of conductive metals or alloy thereof, a known binder, and a known solvent.

Next, on the ceramic green sheet, the conductive paste is coated in a predetermined pattern by various printing methods such as a doctor blade method, a screen printing method, and the like. This is repeated for a plurality of layers to stack and then pressed in stacking direction, thereby a mother multilayer body is obtained. Note that, here, the ceramic green sheet and the conductive paste are stacked so that the ceramic green sheet is positioned on the upper face and the lower face along stacking direction of the mother multilayer body.

The mother multilayer body obtained by such steps is cut by dicing or press cutting, thereby a plurality of green chips is obtained. Then, this green chip is subjected to a binder removal treatment then fired; and the ceramic multilayer body 10 is obtained. Here, firing is performed under a known condition, and for example, a firing temperature can be 1100° C. to 1400° C. Also, the binder removal treatment and firing may be performed after the above-mentioned cutting, or may be performed to the mother multilayer body before cutting.

Next, the pair of external electrodes 4 is formed to the ceramic multilayer body 10 obtained as such. First, the metal paste is coated to each side face 10b from both end faces 10a of the ceramic multilayer body 10 by a dipping method, a printing method, and the like. Then, these are baked, thereby the base electrode layer 40 is formed.

In the present embodiment, the surface roughness Ra1 of the base electrode layer 40 is controlled within a predetermined range, and the surface roughness Ra1 of the base electrode layer 40 is controlled for example by a method described in below.

As the metal component, the metal paste which is a raw material of the base electrode layer 40 includes a metal powder made of a predetermined material (that is, Cu, Ag, Pd, Au, or alloy of these), and also a powder of a plurality of types of oxides mentioned in above is included as the glass component. In order to control the surface roughness Ra1 of the base electrode layer 40, as one method, a metal powder may be constituted by a plurality of types of powders with different average particle size and a blending ratio thereof may be adjusted.

For example, as the metal powder, three different powders having average particle sizes of 0.25 μm (small size powder), 1.0 μm (intermediate size powder), and 3.0 μm (large size powder) are blended. In case of smoothing the base electrode layer 40 (that is, in case of decreasing the surface roughness Ra1), a ratio of the metal powder with small average particle size may be increased. On the other hand, in case of increasing the value of the surface roughness Ra1, a ratio of the powder with large average particle size may be increased. Particularly, in order to have 5.0 μm or less of Ra1, the blending ratio of the small size powder may be 40 to 70 wt % or so.

Also, other than mentioned in above, the surface roughness Ra1 of the base electrode layer 40 changes depending on the shape of the metal powder used and the shape of the glass powder used. As the shape of the powder used is closer to a spherical shape, the surface tends to be smoother, and on the other hand as the ratio of the powder having a needle shape or scale like shape increases, the surface becomes rougher.

The intermediate electrode layer 41 is formed on the base electrode layer 40 by a spattering method, a vapor deposition method, and various plating methods such as a barrel plating method, and the like. Considering a speed of forming and a production efficiency, a plating method is preferably used. In case of carrying out barrel plating, the ceramic body 10 and a metal media are filled into the barrel container in a predetermined blending ratio, and while rotating this barrel container in a predetermined speed, the plating solution for Ni or Ni alloy plating is infiltrated, thereby the intermediate electrode layer 41 is formed. Here, the thickness Tm of the intermediate electrode layer 41 is controlled by adjusting a filling amount of the ceramic body 10 occupying the barrel container, a rotating speed of the barrel container, a length of time of infiltrating the plating solution, and the like.

Also, the surface roughness Ra2 of the intermediate electrode layer 41 can be for example controlled by a ratio of the glass component included in the base electrode layer 40. The ratio of the glass component in the base electrode layer 40 can for example be 5 to 20 parts by weight with respect to 100 parts by weight of the metal paste as a whole. As the ratio of the glass component increases, the surface roughness of the intermediate electrode layer 41 increases. On the other hand, if a ratio of the glass component is small, the surface roughness of the intermediate electrode layer 41 tends to be smoother.

Also, when the intermediate electrode layer 41 is formed by barrel plating, the surface roughness Ra2 of the intermediate electrode layer 41 can be controlled by a blending ratio between the ceramic multilayer body 10 and the metal media in the barrel container, a shape and a size of the metal media, and the like.

Further, the upper electrode layer 43 is formed on the intermediate electrode layer 41 by a means such as various plating methods including barrel plating and the like, a spattering method, a vapor deposition method, and the like. For the upper electrode layer 43, a plating method is preferably employed from the point of a production efficiency, and in such case, a specific treatment method is same as in case of forming the intermediate electrode layer 41.

When the upper electrode layer 43 is formed by barrel plating, the surface roughness Ra3 of the upper electrode layer 43 can be controlled by applying ultrasonic vibration to the plating solution, by adjusting a blending ratio of the ceramic multilayer body 10 and the metal media in the barrel container, by adjusting a shape and a size of the metal media, and so on. Alternatively, after forming the upper electrode layer 43, by performing etching, sandblast treatment, and like to the surface of the upper electrode layer 43, the surface roughness Ra3 may be controlled. The sandblast treatment is preferably used for controlling the surface roughness since the sandblast can be used to a method of forming other than plating. In order to make the surface roughness Ra3 of the upper electrode layer 43 rougher, a particle size (0.5 μm to 2.0 μm) of the powder applied during the sandblast treatment may be increased, or by performing the sandblast treatment for longer time.

As discussed in above, the external electrode 4 having three layers is formed to the ceramic multilayer body 10 by the above-mentioned steps. Note that, to the side face 10b of the ceramic multilayer body 10 which is not formed with the external electrode 4, a protective layer having an insulation property may be formed.

Figure 4:
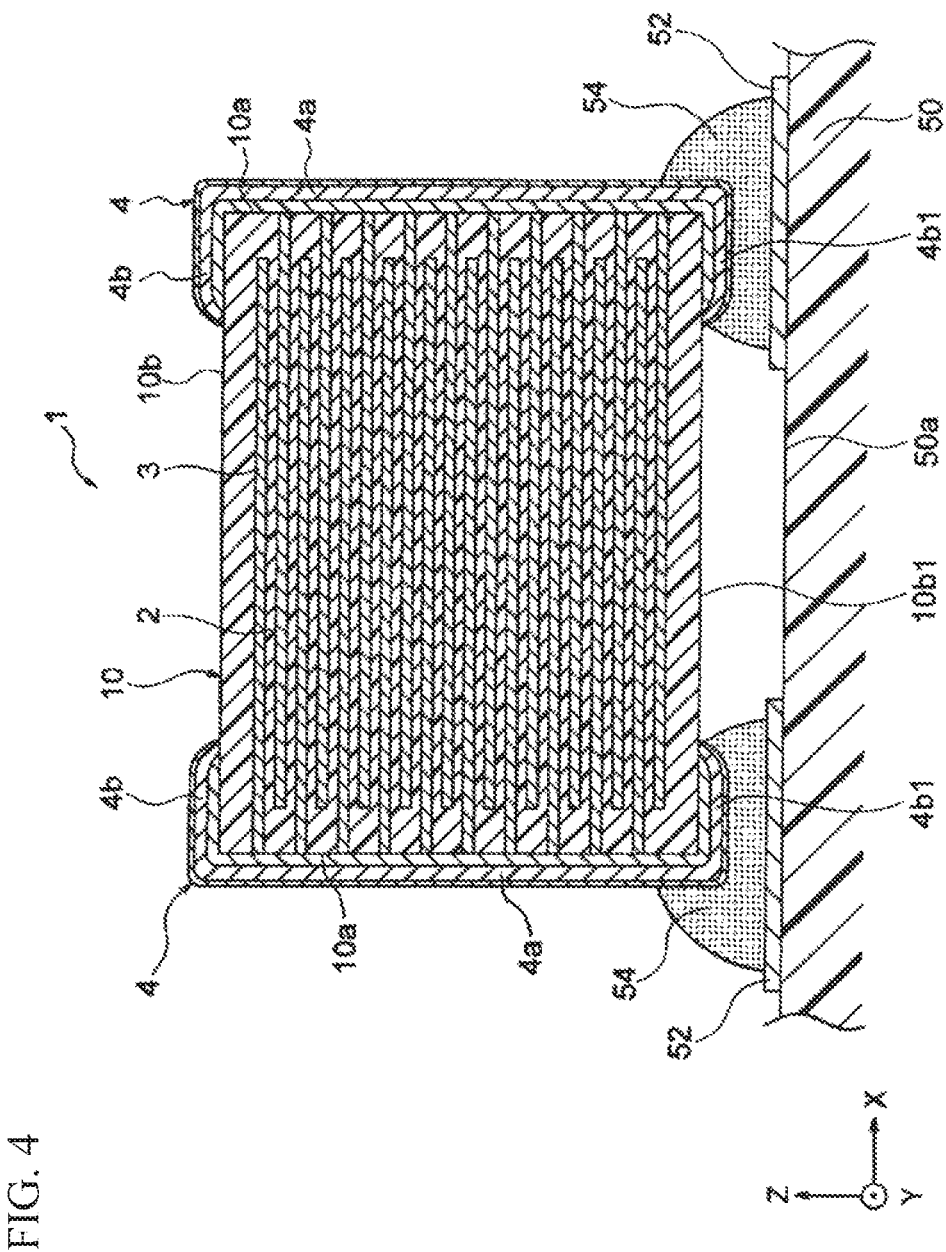
FIG. 4 shows a cross section of an essential part showing a mounted state of the multilayer ceramic capacitor of FIG. 1.

As shown in FIG. 4, the ceramic capacitor 1 according to the present embodiment obtained as such is mounted on the mounting substrate 50 and the like by a bonding material. As the bonding material used in such case, a conductive adhesive agent 54 having a heat resistant is preferably used. The conductive adhesive agent 54 is prepared by adding a conductive filler to a resin component.

As the resin component of the conductive adhesive agent 54, for example, heat curable resins such as epoxy resin, polyurethane, polyester, silicone resin, and the like; thermoplastic resins such as polypropylene, polyamide, polyimide, and the like; and UV curable resins obtained by blending a photopolymerization initiator with the above-mentioned resins can be used. Preferably, an epoxy based heat curable resin is used. Further, as a conductive filler, a metal powder such as Au, Ag, Cu, Ni, Al, and the like can be used, and preferably Ag filler is used.

Upon mounting, first, the conductive adhesive agent 54 is coated on a wiring pattern 52 formed on the surface 50a (the mounting face) of the mounting substrate 50. Further, the multilayer ceramic capacitor 1 is pressed on the conductive adhesive agent 54 so that one side face 10b1 of the ceramic body 10 is approximately parallel to the mounting face 50a. At this time, the external electrode extension part 4b1 formed to one side face 10b1 of the ceramic body 10 and a part of the external electrode end part 4a close to the mounting face are covered by the conductive adhesive agent 54 and bonded.

Note that, depending on the type of the conductive adhesive agent 54 being used, a curing treatment such as a heat treatment, an UV irradiation treatment, or the like is carried out. For example, in case of using the epoxy based heat curable resin, a heat treatment at 150° C. to 220° C. or so may be performed. Also, the pair of external electrodes 4 are insulated against each other, and a method of coating and a coating amount of the conductive adhesive agent 54 are adjusted so that a short circuit does not occur between the external electrodes 4.

As discussed in above, in the multilayer ceramic capacitor 1 according to the present embodiment, the external electrode 4 is formed of three layer structure that is the base electrode layer 40, the intermediate electrode layer 41, and the upper electrode layer 43; and the surface roughness of each electrode layer is controlled within the predetermined range. Specifically, in the present embodiment, the surface roughness Ra1 of the base electrode layer 40 is 5.0 μm or less.

When the surface of the base electrode layer 40 is rough, air and foreign objects tend to easily enter in the boundary between the base electrode layer 40 and the intermediate electrode layer 41, and defects such as pinhole and the like tends to easily occur to the intermediate electrode layer 41. Particularly, when the intermediate electrode layer 41 is formed by plating, hydrogen gas generated during plating tends to easily adhere to the surface of the base electrode layer 40. As such, when defect exists in the intermediate electrode layer 41, the base electrode layer 40 and the intermediate electrode layer 41 tend to easily have oxidation deterioration.

Also, when the intermediate electrode layer 41 or the upper electrode layer 43 is formed by plating, if the intermediate electrode layer 41 has defects, a plating solution may enter to a defected part, and hydrogen gas could diffuse to the dielectric layer (that is, the ceramic layer 2) of the ceramic body 10. As a result, the insulation resistance of the ceramic body itself tends to easily decrease.

In the present embodiment, when the surface roughness Ra1 of the base electrode layer 40 is 5.0 μm or less, air and foreign objects are further effectively prevented from existing in the boundary between the base electrode layer 40 and the intermediate electrode layer 41. As a result, defects such as pinhole and the like are suppressed from forming in the intermediate electrode layer 41 and also a smooth intermediate electrode layer 41 tends to be easily obtained. Therefore, in the present embodiment, problems due to the above-mentioned defects of the intermediate electrode layer 41 (such as oxidation deterioration and decrease of insulation resistance) do not occur, and even if it is exposed under high temperature environment, the insulation resistance barely decreased and a good highly accelerated lifetime is obtained, thus the mounting reliability improves.

Also, in the multilayer ceramic capacitor 1 according to the present embodiment, the surface roughness of each electrode layer 40, 41, and 43 of the external electrode layer 4 satisfies the relationship of Ra1>Ra3≥Ra2 (in case, Ra3≈Ra2, Ra2 and Ra3 are both 1.0 μm or less).

Usually, when the external electrode of three layer structure is formed without considering the surface roughness, the relationship of the surface roughness of each electrode layer tends to be Ra1>Ra2>Ra3. In case the relationship of the surface roughness is as such, a localized stress tends to easily concentrate to the upper electrode layer 43 by a bump on the intermediate electrode layer 41. Also, a tensile stress is generated to the upper electrode layer 43 due to the roughness of the intermediate electrode layer 41.

On the contrary to this, in the present embodiment, by giving slight roughness to the surface of the upper electrode layer 43 to satisfy the relationship of Ra1>Ra3≥Ra2, the concentration of stress and tensile stress acting on the upper electrode layer 43 due to the influence of the surface condition of the intermediate electrode layer 41 tend to be relieved. As a result, in the multilayer ceramic capacitor 1 according to the present embodiment, even if a plurality of times of heat shocks which is from −55° C. to 200° C. is applied after mounting, a crack rarely forms to the upper electrode layer 43. Even if a crack is formed, progression of the crack can be suppressed. That is, by satisfying Ra1>Ra3≥Ra2, a high heat shock resistance can be obtained and the mounting reliability improves.

Particularly, in the multilayer ceramic capacitor 1 according to the present embodiment, the surface roughness Ra1 of the base electrode layer 40 is 5.0 μm or less, the relationship of the surface roughness of each electrode layer is Ra1>Ra3≥Ra2, and more preferably Ra1>Ra3>Ra2 (that is, the relationship of 5.0 μm≥Ra1>Ra3>Ra2 is satisfied). Therefore, in the present embodiment, a good highly accelerated lifetime and a good heat shock resistance can be both attained and the mounting reliability is further improved.

Also, in the present embodiment, the thickness Tu of the upper electrode layer 43 is preferably 1.0 μm or less.

In case of the conventional technology which does not regulate the surface roughness of each electrode layer (that is, neither 5.0 μm≥Ra1 nor Ra1>Ra3≥Ra2 is satisfied), if the thickness Tu of the upper electrode layer 43 is thin as 1.0 μm or less, the upper electrode layer 43 tends to be easily influenced by the surface condition of the base electrode layer 40 and the intermediate electrode layer 41.

Also, in case of the conventional technology, when the thickness Tu of the upper electrode layer 43 becomes thick as 1.0 μm or more, the influence from the surface condition of the base electrode layer 40 and the intermediate electrode layer 41 is reduced, however the surface condition of the upper electrode layer 43 is deteriorated, and a crack tends to easily form on the upper electrode layer 43. Also, the upper electrode layer 43 includes precious metal elements such as Pd, Au, or the like, then as the thickness Tu of the upper electrode layer 43 becomes thicker, a cost for the raw materials increases.

In the present embodiment, as mentioned in above, the surface roughness is controlled within the predetermined ranges. Thus, even when the thickness Tu of the upper electrode layer 43 is thin as 1.0 μm or less, the upper electrode layer 43 is scarcely influenced by the surface condition of the base electrode 40 and the intermediate electrode layer 41. As a result, in the present embodiment, when the thickness Tu of the upper electrode layer 43 is 1.0 μm or less, the mounting reliability further improves. Also, as the thickness of the upper electrode layer 43 is 1.0 μm or less, a cost for the raw materials can be reduced.

Also, in the present embodiment, as the glass component included in the base electrode layer 40, zinc oxide, boron oxide, silicon oxide, and aluminum oxide can be included. By including such glass compounds, the base electrode layer is densified and a good plating resistance can be obtained.

Further, in the present embodiment, a content of zinc oxide and a content of boron oxide included in the glass component are controlled to a predetermined ratio with respect to other glass compounds. Thereby, the plating resistance of the base electrode layer 40 is further improved. Also, releasing (insufficient adhesion) between the glass component part of the base electrode layer 40 and the intermediate electrode layer 41 can be suppressed from occurring. As a result, the intermediate electrode layer 41 becomes smoother, thus the heat shock resistance and the highly accelerated lifetime are further improved.

Further, in the present embodiment, a content ratio of Ni at the surface of the upper electrode layer 43 can be 5.0 wt % or less. Here, the meaning of "a content ratio of Ni is 5.0 wt % or less" includes that Ni in an alloy ratio of the upper electrode layer 43 is 5 wt % or less. It also means that Ni is 5 wt % or less since the intermediate electrode layer 41 which is beneath the upper electrode layer 43 is not exposed at the surface of the upper electrode layer 43.

As such, at the surface of the upper electrode layer 43, the content ratio of Ni component easily oxidized is controlled within a predetermined range (in other words, the intermediate electrode layer 41 is not exposed), thus even when thermal stress of about 200° C. or so is applied after mounting, decrease of the adhesive strength at Ni oxidized surface can be suppressed. Therefore, the heat shock resistance and the highly accelerated lifetime are further enhanced and the mounting reliability is improved.

Hereinabove, the embodiment of the present invention has been described, however the present invention is not limited to the above-mentioned embodiment, and the present invention can be variously modified within the scope of the present invention.

For example, in the present embodiment, the multilayer ceramic capacitor is mentioned as an example of the ceramic electronic device, however the present invention can be used for a piezoelectric device, a thermistor, a varistor, a filter, and an inductor. In case of using to a piezoelectric device, the ceramic layer 2 may be constituted by piezoelectric ceramics; in case of using to a thermistor, the ceramic layer 2 may be constituted by semiconductor ceramics; in case of using to a inductor, the ceramic layer 2 may be constituted by magnetic ceramics such as ferrite or so.

Also, in the present embodiment, the ceramic layers 2 and the internal electrode layers 3 are stacked along Z axis, however the stacking direction may be along X axis or Y axis. In such case, the external electrode 4 may be formed in accordance with an exposed face of the internal electrode layers 3. Further, in the present embodiment, the mounted state shown in FIG. 4 is described using the conductive adhesive agent 54 as the bonding material, however, other than this, a high temperature solder such as Au—Sn based, Au—Ge base, and the like may be used.

EXAMPLES

Hereinbelow, the present invention is described based on further detailed examples, however the present invention is not limited thereto.

Experiment 1

In Experiment 1, capacitor samples according to Examples 1 to 20 were produced. As the ceramic body 10 of each capacitor sample, a sample of sintered body stacking ceramic layers 2 using $CaZrO_3$ as a main component and internal electrode layers 3 including Ni was used. Then, to this sample of sintered body, a pair of external electrodes 4 was formed by steps shown in below.

First, a metal paste as a raw material of a base electrode layer 40 was prepared. This metal paste was obtained by mixing and kneading a metal powder, a glass component, and a vehicle in a predetermined ratio. Here, the glass component was prepared by using $ZnO$, $B_2O_3$, $SiO_2$, and $Al_2O_3$ as a raw material, and also mixing one or more sub components selected from $BaCO_3$, $CaCO_3$, $SrCO_3$, $MgCO_3$, and $V_2O_5$. Note that, an average particle size of glass compounds was 2.0 to 3.0 μm according to the measurement by a laser diffraction method.

Also, as the metal powder included in the metal paste, a mixed powder which was a mixture of a small size Cu powder having an average particle size of 0.25 μm, an intermediate size Cu powder having an average particle size of 1.0 μm, and a large size Cu powder having an average particle size of 3.0 μm was used. Note that, a blending ratio of each powder was different in Examples 1 to 20, and by adjusting this blending ratio, a surface roughness Ra1 of the base electrode layer 40 was controlled. Also, a total amount of the glass component included in the metal paste varied in Examples 1 to 20, and by adjusting a ratio of this glass component, a surface roughness Ra2 of the intermediate electrode layer 4 mentioned in below was controlled.

The base electrode layer 40 was formed by a dip coating method. Specifically, both end faces 10a and part of each side face 10b of the sample of sintered body were immersed in the above-mentioned metal paste and baked at a temperature of 700° C. to 900° C., thereby the base electrode layer 40 was formed. A thickness Tg of the base electrode layer 40 formed was within a range of 5 μm to 25 μm.

Next, the intermediate electrode layer 41 which was a Ni plating layer was formed on the base electrode layer 40 by a barrel plating method. Specifically, a sample of sintered body formed with the base electrode layer 40 and a metal media having φ 1.0 mm were placed in a barrel container in a predetermined ratio and this barrel container was immersed in a Ni plating solution for 30 minutes to 60 minutes or so, thereby the intermediate electrode layer 41 was formed. A thickness Tm of the intermediate electrode layer 41 formed was within a range of 3 μm to 20 μm.

Next, the upper electrode layer 43 was formed on the intermediate electrode layer 41. In Examples 1 to 10, as the upper electrode layer 43, an alloy plating layer of Pd90-Ni10 (wt %) was formed by barrel plating. Further, in Examples 11 to 20, as the upper electrode layer 43, an alloy plating layer of Au90-Ni10 (wt %) was formed by electroplating. Note that, in all of the cases, a thickness Tu of the upper electrode layer 43 was 1.0 μm or less, and specifically within a range of 0.1 μm to 0.8 μm.

After forming the upper electrode layer 43, a sandblast treatment was performed to the external electrode end part 4a. Here, in Examples 1 to 20, a particle size of the powder blown and a length of time of treatment were varied and experiment was carried out, thereby a surface roughness Ra3 of the upper electrode layer 43 was controlled.

By the production steps described in above, 300 or more capacitor samples were produced for each of Examples 1 to 20, then evaluations described in below were performed. Note that, a size (length along X axis×width along Y axis×height along Z axis) of the ceramic body 10 of each capacitor sample was 1.6 mm×0.8 mm×0.8 mm for Examples 1 to 7 and 11 to 17; 2.0 mm×1.2 mm×1.2 mm for Examples 8 and 18; 3.2 mm×1.6 mm 1.6 mm for Examples 9 and 19; and 4.5 mm×3.2 mm×2.0 mm for Examples 10 and 20.

Evaluation

Measurement of Surface Roughness

The surface roughness of the external electrode end part 4a of each example was measured by carrying out image analysis to SEM image. The capacitor sample was fixed by an embedding resin and cut at approximate center position along Y axis, then the cross section (that is, X-Z cross section) was mirror polished, thereby a sample for cross section observation was obtained. In SEM observation, the cross section of the external electrode end part 4a was observed using FE-SEM (S-4800 made by Hitachi Power Solution Co., Ltd) under magnification of 10000× to 50000×. Backscattered electron images of five observation fields were obtained per one sample.

The cross section image obtained as such was subjected to image analysis and an arithmetic average surface roughness of each electrode layer 40, 41, and 43 was calculated. Note that, in the measurement of the arithmetic average surface roughness, the reference length Lr was set to 50 μm. Table 1 shows the results of measurement of Examples 1 to 10 in which the main component of the upper electrode layer 43 was Pd; and Table 2 shows the results of measurement of Examples 11 to 20 in which the main component of the upper electrode layer 43 was Au.

Mounting on Substrate

Before performing a heat shock test and a highly accelerated life test described in below, a capacitor sample of each example was mounted on a mounting substrate 50 made of $Si_3N_4$. On an upper face of the mounting substrate 50 made of $Si_3N_4$, a wiring pattern 52 including Cu was formed, and on the wiring pattern 52, a conductive adhesive agent 54 was used; thereby each capacitor sample was bonded to the mounting substrate. As the conductive adhesive agent, a heat resistant conductive adhesive agent including Ag filler in an epoxy based heat curable resin was used. After placing the capacitor sample, the resin was cured by heat treatment, thereby the capacitor sample was mounted.

Heat Shock Test (Thermal Cycle Test)

A heat shock test was performed to the capacitor sample after mounting, and a defective rate after test was evaluated. As the heat shock test, two patterns of thermal cycles, that is a thermal cycle of −55° C./150° C. and a thermal cycle of −55° C./200° C. were performed. Specifically, for each cycle, the capacitor sample was exposed to an environment of −55° C. for 30 minutes and then exposed to an environment of 150° C. or 200° C. for 30 minutes. This cycle was repeated for 1000 cycles.

After applying the heat shock, the capacitor sample was fixed in the embedding resin together with the mounting substrate 50. Then, this embedded sample was mirror polished along Y axis of the capacitor sample until the polished surface reached at approximate center position along Y axis, thereby X-Z cross section was exposed. Next, this sample was observed using a metallographic microscope under magnification of 100 to 500×. Thereby, a crack at a bonding boundary between the external electrode 4 (particularly, the upper electrode layer 43) and the conductive adhesive agent 54 was verified. The above-mentioned evaluation was carried out to 100 samples per each of Examples 1 to 20, and the defective rate of the samples having a crack was calculated.

Note that, in case of −55° C./150° C. thermal cycle test, the defective rate of the heat shock test of 5% or less was considered pass and 0% was considered good. Also, in case of −55° C./200° C. thermal cycle test, the defective rate of the heat shock test of 20% or less was considered pass, 10% or less was considered good, and 5% or less was considered best. Table 1 shows the evaluation results of Examples 1 to 10 and Table 2 shows the evaluation results of Examples 11 to 20.

Highly Accelerated Life Test

Other than the heat shock test, the capacitor sample after mounting was subjected to a highly accelerated life test, and a defective rate after the test was evaluated. During the highly accelerated life test, the capacitor sample after mounting was exposed under a high temperature environment of 200° C. for 1000 hours. Here, DC voltage of 10 V/μm was applied with respect to the ceramic layer 2, and an insulation resistance during the test was measured. When the insulation resistance of the sample during the test dropped by one digit or more, then it was considered defected.

The above-mentioned evaluation was performed to 100 samples of each of Examples 1 to 20, and the defective rate of the samples considered defected was calculated. Note that, the defective rate of the highly accelerated life test of 20% or less was considered pass, 10% or less was considered good, and 5% or less was considered best. Table 1 shows the evaluation results of Examples 1 to 10 and Table 2 shows the evaluation results of Examples 11 to 20.

Comparative Example 1

In Comparative example 1, as similar to Examples 1 to 10, the capacitor sample was produced using Pd as the main component of the upper electrode layer 43. Note that, in Comparative example 1, when each electrode layer 40, 41, and 43 were formed, the surface roughness was not particularly controlled. That is, in Comparative example 1, when the base electrode layer 40 was formed, Cu powder having an average particle size of 3.0 μm was only used as the metal powder included in the metal paste. Also, in Comparative example 1, after the upper electrode layer 43 was formed, a sandblast treatment was not performed.

Comparative Example 2

In Comparative example 2, the main component of the upper electrode layer 43 was constituted by Au, and other than this, experiment conditions were same as Comparative example 1, thereby the capacitor sample was produced. That is, in Comparative example 2, treatments for controlling the surface roughness of each electrode layer 40, 41, and 43 were not performed.

Comparative examples 1 and 2 were subjected to the same evaluations as Examples 1 to 20. Results are shown in Table 1 and Table 2.

TABLE 1

| Sample No. | Ceramic body Size mm | Upper electrode layer Main component | Surface roughness of upper electrode end part | | | Defective rate of heat shock test | | Defective rate of high temperature life test |
| --- | --- | --- | --- | --- | --- | --- | --- | --- |
| | | | Base electrode layer Ra1 (μm) | Intermediate electrode layer Ra2 (μm) | Upper electrode layer Ra3 (μm) | −55° C./ 150° C. % | −55° C./ 200° C. % | 200° C - 1000 h % |
| Comparative example 1 | 1.6 × 0.8 × 0.8 | Pd(1.0 μm or less) | 8.50 | 4.25 | 2.13 | 1 | 42 | 29 |
| Example 1 | 1.6 × 0.8 × 0.8 | Pd | 4.45 | 2.23 | 1.11 | 3 | 27 | 16 |
| Example 2 | 1.6 × 0.8 × 0.8 | Pd | 6.66 | 1.67 | 2.22 | 0 | 18 | 25 |

TABLE 1-continued

| Sample No. | Ceramic body Size mm | Upper electrode layer Main component | Surface roughness of upper electrode end part | | | Defective rate of heat shock test | | Defective rate of high temperature |
|---|---|---|---|---|---|---|---|---|
| | | | Base electrode layer Ra1 (μm) | Intermediate electrode layer Ra2 (μm) | Upper electrode layer Ra3 (μm) | −55° C./ 150° C. % | −55° C./ 200° C. % | life test 200° C. - 1000 h % |
| Example 3 | 1.6 × 0.8 × 0.8 | Pd | 5.00 | 1.25 | 1.67 | 0 | 12 | 15 |
| Example 4 | 1.6 × 0.8 × 0.8 | Pd | 4.21 | 1.05 | 1.40 | 0 | 13 | 13 |
| Example 5 | 1.6 × 0.8 × 0.8 | Pd | 3.35 | 0.84 | 1.12 | 0 | 14 | 12 |
| Example 6 | 1.6 × 0.8 × 0.8 | Pd | 2.34 | 0.59 | 0.78 | 0 | 15 | 15 |
| Example 7 | 1.6 × 0.8 × 0.8 | Pd | 1.05 | 0.26 | 0.35 | 0 | 17 | 16 |
| Example 8 | 2.0 × 1.2 × 1.2 | Pd | 4.82 | 1.21 | 1.61 | 0 | 17 | 14 |
| Example 9 | 3.2 × 1.6 × 1.6 | Pd | 3.95 | 0.99 | 1.32 | 0 | 12 | 12 |
| Example 10 | 4.5 × 3.2 × 2.0 | Pd | 3.70 | 0.93 | 1.23 | 0 | 15 | 12 |

TABLE 2

| Sample No. | Ceramic body Size mm | Upper electrode layer Main component | Surface roughness of upper electrode end part | | | Defective rate of heat shock test | | Defective rate of high temperature hfe test |
|---|---|---|---|---|---|---|---|---|
| | | | Base electrode layer Ra1 (μm) | Intermediate electrode layer Ra2 (μm) | Upper electrode layer Ra3 (μm) | −55° C./ 150° C. % | −55° C./ 200° C. % | 200° C.-1000 h % |
| Comparative example 2 | 1.6 × 0.8 × 0.8 | Au (1.0 μm or less) | 9.24 | 4.62 | 1.85 | 3 | 30 | 24 |
| Example 11 | 1.6 × 0.8 × 0.8 | Au | 4.50 | 2.25 | 0.90 | 2 | 25 | 16 |
| Example 12 | 1.6 × 0.8 × 0.8 | Au | 6.34 | 1.59 | 2.11 | 0 | 16 | 23 |
| Example 13 | 1.6 × 0.8 × 0.8 | Au | 4.86 | 1.22 | 1.62 | 0 | 12 | 12 |
| Example 14 | 1.6 × 0.8 × 0.8 | Au | 3.05 | 0.76 | 1.02 | 0 | 15 | 15 |
| Example 15 | 1.6 × 0.8 × 0.8 | Au | 2.15 | 0.54 | 0.72 | 0 | 13 | 14 |
| Example 16 | 1.6 × 0.8 × 0.8 | Au | 1.69 | 0.42 | 0.56 | 0 | 16 | 14 |
| Example 17 | 1.6 × 0.8 × 0.8 | Au | 0.95 | 0.24 | 0.32 | 0 | 12 | 12 |
| Example 18 | 2.0 × 1.2 × 1.2 | Au | 0.80 | 0.20 | 0.27 | 0 | 15 | 12 |
| Example 19 | 3.2 × 1.6 × 1.6 | Au | 2.55 | 0.64 | 0.85 | 0 | 12 | 12 |
| Example 20 | 4.5 × 3.2 × 2.0 | Au | 1.65 | 0.41 | 0.55 | 0 | 14 | 15 |

As shown in Table 1, in Comparative example 1, the surface roughness Ra1 of the base electrode layer 40 was 7.0 μm or more and the relationship of the surface roughness of each electrode layer 40, 41, and 43 was Ra1>Ra2>Ra3. Comparative example 1 passed the heat shock test of −55° C./150° C. However, when harsher heat stress of 200° C. was applied, the defective rate increased, and Comparative example 1 could not pass the heat shock test of −55° C./200° C. Also, Comparative example 1 was unable to pass the highly accelerated life test. That is, the conventional technology such as Comparative example 1 cannot ensure a sufficient mounting reliability when harsher heat stress than the conventional technology such as 200° C. or so was applied.

On the other hand, in Example 1, the surface roughness Ra1 of the base electrode layer 40 was 5.0 μm or less. Thereby, in Example 1, although the thickness Tu of the upper electrode layer 43 was 1.0 μm or less as similar to Comparative example 1, the defective rate of heat shock test of −55° C./200° C. and the defective rate of the highly accelerated life test were lower than Comparative example 1. Particularly, Example 1 passed the highly accelerated life test. According to this result, it was confirmed that by having Ra1 of 5.0 μm or less, the high temperature accelerated lifetime was improved than conventional technology (that is, Comparative example 1).

Also, in Example 2, Ra1 was 5.0 μm or more, and the relationship between the surface roughness of each electrode layer 40, 41, and 43 was Ra1>Ra3>Ra2. Thereby, even though in Example 2, the thickness Tu of the upper electrode layer 43 was 1.0 μm or less, the defective rate of heat shock test −55° C./200° C. and the defective rate of highly accelerated life test were lower than Comparative example 1. Particularly, Example 2 passed the heat shock test of −55° C./200° C. According to this result, it can be confirmed that by having Ra1>Ra3>Ra2, the heat shock resistance improved compared to the conventional technology (that is comparative examples).

Further, in Examples 3 to 7, Ra1 was 5.0 μm or less and the relationship of the surface roughness of each electrode layer was Ra1>Ra3>Ra2. Thus, even though the thickness Tu of the upper electrode layer 43 was 1.0 μm or less, Examples 3 to 7 passed the heat shock test and the highly accelerated life test. According to this result, when the surface roughness of each electrode layer 40, 41, and 43 satisfied the relationship of 5.0 μm≥Ra1>Ra3>Ra2, a good heat shock resistance and a good high temperature lifetime were both attained, and the mounting reliability was even more improved.

Note that, in Examples 8 to 10, the size of the ceramic body 10 was changed. As similar to Examples 3 to 7, Examples 8 to 10 also passed the heat shock test and the highly accelerated life test. As a result, it was confirmed that even when the size of the ceramic body 10 was changed, the effect of improving the mounting reliability can be attained.

Also, Table 2 shows the evaluation results when the main component of the upper electrode layer 43 was Au. As shown in Table 2, when Au was the main component (Examples 11 to 20), same tendencies were confirmed as in case the main component was Pd (Examples 1 to 10); and the mounting reliability was improved compared to the conventional technology (Comparative example 2).

Experiment 2

In Experiment 2, an experiment was carried out by varying a content ratio and a type of the glass component included in the base electrode layer 40, thereby capacitor samples according to Examples 31 to 70 were produced.

Specifically, in Examples 31 to 34, three glass compounds were selected from zinc oxide, boron oxide, silicon oxide, and aluminum oxide as main compounds of the glass component. Further, in Examples 35 to 70, zinc oxide, boron oxide, silicon oxide, and aluminum oxide were all used as main compounds in the glass component, and a content ratio of zinc oxide and a content ratio of boron oxide in the glass component were varied.

Note that, in all of Examples 31 to 70 of Experiment 2, besides the above-mentioned main compounds, sub components such as SrO, MgO, BaO, $V_2O_5$, CaO, and the like were included about 1 to 10 parts by mol with respect to the glass component as a whole. The main compounds of the glass component of Examples 31 to 70 are shown in Table 3 and Table 4. In Table 3 and Table 4, "Y" indicates the compound shown in the column was included, and "N" means it was not included.

A composition of the glass component was verified by carrying out component analysis to the cross section of the base electrode layer 40 using an energy dispersive X ray spectroscopy (EDX, EMAX ENERGY EX-350 made by HORIBA., Ltd) when SEM observation was performed. Also, a laser ablation inductively coupled plasma mass spectroscopy (LA-ICP-MS) was used together to confirm the composition of the glass component. As a result, in both case of SEM-EDX and LA-ICP-MS, all Examples were confirmed to have the glass compounds of a charged amount.

Regarding Examples 31 to 70, a content ratio of zinc oxide ($\alpha/B1$) and a content ratio of boron oxide ($\beta/B2$) obtained by the above-mentioned component analysis are shown in Table 3 and Table 4. The content ratio of zinc oxide was obtained by dividing a content ($\alpha$) of zinc oxide in the glass component as a whole with respect to a sum (B1) of a content of other main compounds (boron oxide, silicon oxide, and aluminum oxide) when the glass component as whole was 100 mol. Also, the content ratio of boron oxide (($\beta/B1$) was obtained by dividing a content ($\beta$) of boron oxide in the glass component as a whole with respect to a sum (B2) of a content of silicon oxide and aluminum oxide when the glass component as a whole was 100 mol.

Also, in all of Examples 31 to 70 of Experiment 2, the surface roughness of each electrode layer 40, 41, and 43 satisfied 5.0 $\mu m \geq Ra1 > Ra3 > Ra2$. Further, in Examples 31 to 57, the main component of the upper electrode 43 was Pd, and in Examples 61 to 70, the main component of the upper electrode 43 was Au. The experiment conditions other than the above in Experiment 2 were same as Experiment 1. Further, the mounting reliability of the capacitor samples according to Examples 31 to 70 of Experiment 2 were evaluated as similar to Experiment 1. The results are shown in Table 3 and Table 4.

TABLE 3

| | | Constitutions of base electrode layer | | | | | | |
|---|---|---|---|---|---|---|---|---|
| | Ceramic body Size | Main compounds included in glass component | | | | Content ratio of glass component | | Upper electrode layer |
| Sample No. | mm | ZnO | $B_2O_3$ | $SiO_2$ | $Al_2O_3$ | Content ratio of ZnO ($\alpha/B1$) | Content ratio of $B_2O$ ($\beta/B2$) | Main component |
| Example 31 | 1.6 × 0.8 × 0.8 | N | Y | Y | Y | — | 0.65 | Pd |
| Example 32 | 1.6 × 0.8 × 0.8 | Y | N | Y | Y | 0.30 | — | Pd |
| Example 33 | 1.6 × 0.8 × 0.8 | Y | Y | N | Y | 0.30 | 0.65 | Pd |
| Example 34 | 1.6 × 0.8 × 0.8 | Y | Y | Y | N | 0.30 | 0.65 | Pd |
| Example 35 | 1.6 × 0.8 × 0.8 | Y | Y | Y | Y | 0.20 | 0.50 | Pd |
| Example 36 | 1.6 × 0.8 × 0.8 | Y | Y | Y | Y | 0.35 | 0.80 | Pd |
| Example 37 | 1.6 × 0.8 × 0.8 | Y | Y | Y | Y | 0.25 | 0.50 | Pd |
| Example 38 | 1.6 × 0.8 × 0.8 | Y | Y | Y | Y | 0.20 | 0.60 | Pd |
| Example 39 | 1.6 × 0.8 × 0.8 | Y | Y | Y | Y | 0.28 | 0.65 | Pd |
| Example 40 | 1.6 × 0.8 × 0.8 | Y | Y | Y | Y | 0.30 | 0.70 | Pd |
| Example 41 | 2.0 × 1.2 × 1.2 | Y | Y | Y | Y | 0.20 | 0.50 | Pd |
| Example 42 | 2.0 × 1.2 × 1.2 | Y | Y | Y | Y | 0.35 | 0.80 | Pd |
| Example 43 | 2.0 × 1.2 × 1.2 | Y | Y | Y | Y | 0.28 | 0.75 | Pd |
| Example 44 | 2.0 × 1.2 × 1.2 | Y | Y | Y | Y | 0.35 | 0.65 | Pd |
| Example 45 | 2.0 × 1.2 × 1.2 | Y | Y | Y | Y | 0.32 | 0.60 | Pd |
| Example 46 | 2.0 × 1.2 × 1.2 | Y | Y | Y | Y | 0.25 | 0.65 | Pd |
| Example 47 | 3.2 × 1.6 × 1.6 | Y | Y | Y | Y | 0.20 | 0.50 | Pd |
| Example 48 | 3.2 × 1.6 × 1.6 | Y | Y | Y | Y | 0.35 | 0.80 | Pd |
| Example 49 | 3.2 × 1.6 × 1.6 | Y | Y | Y | Y | 0.30 | 0.50 | Pd |
| Example 50 | 3.2 × 1.6 × 1.6 | Y | Y | Y | Y | 0.20 | 0.70 | Pd |
| Example 51 | 3.2 × 1.6 × 1.6 | Y | Y | Y | Y | 0.28 | 0.70 | Pd |
| Example 52 | 3.2 × 1.6 × 1.6 | Y | Y | Y | Y | 0.30 | 0.60 | Pd |
| Example 53 | 4.5 × 3.2 × 2.0 | Y | Y | Y | Y | 0.20 | 0.50 | Pd |
| Example 54 | 4.5 × 3.2 × 2.0 | Y | Y | Y | Y | 0.35 | 0.80 | Pd |
| Example 55 | 4.5 × 3.2 × 2.0 | Y | Y | Y | Y | 0.32 | 0.75 | Pd |
| Example 56 | 4.5 × 3.2 × 2.0 | Y | Y | Y | Y | 0.35 | 0.60 | Pd |
| Example 57 | 4.5 × 3.2 × 2.0 | Y | Y | Y | Y | 0.32 | 0.65 | Pd |

TABLE 3-continued

| Sample No. | Surface roughness of external electrode end part | | | Defective rate of heat shock test −55° C./200° C. % | Defective rate of high temperature life test 200° C - 1000 h % |
|---|---|---|---|---|---|
| | Base electrode layer Ra1 (μm) | Intermediate electrode layer Ra2 (μm) | Upper electrode layer Ra3 (μm) | | |
| Example 31 | 3.04 | 0.76 | 1.01 | 16 | 14 |
| Example 32 | 3.35 | 0.84 | 1.12 | 12 | 12 |
| Example 33 | 3.25 | 0.81 | 1.08 | 14 | 15 |
| Example 34 | 3.15 | 0.79 | 1.05 | 15 | 12 |
| Example 35 | 2.34 | 0.59 | 0.78 | 15 | 15 |
| Example 36 | 1.05 | 0.26 | 0.35 | 17 | 16 |
| Example 37 | 3.30 | 0.83 | 1.10 | 12 | 12 |
| Example 38 | 3.40 | 0.85 | 1.13 | 12 | 12 |
| Example 39 | 2.30 | 0.38 | 0.46 | 6 | 6 |
| Example 40 | 3.25 | 0.54 | 0.65 | 7 | 8 |
| Example 41 | 2.12 | 0.53 | 0.71 | 15 | 12 |
| Example 42 | 4.82 | 1.21 | 1.61 | 17 | 14 |
| Example 43 | 4.70 | 1.18 | 1.57 | 13 | 13 |
| Example 44 | 4.60 | 1.15 | 1.53 | 13 | 14 |
| Example 45 | 2.20 | 0.37 | 0.44 | 8 | 7 |
| Example 46 | 4.65 | 0.78 | 0.93 | 9 | 7 |
| Example 47 | 2.45 | 0.61 | 0.82 | 14 | 15 |
| Example 48 | 3.95 | 0.99 | 1.32 | 12 | 12 |
| Example 49 | 4.10 | 1.03 | 1.37 | 15 | 12 |
| Example 50 | 3.95 | 0.99 | 1.32 | 13 | 14 |
| Example 51 | 2.30 | 0.38 | 0.46 | 7 | 8 |
| Example 52 | 4.05 | 0.68 | 0.81 | 6 | 6 |
| Example 53 | 1.75 | 0.44 | 0.58 | 13 | 13 |
| Example 54 | 3.70 | 0.93 | 1.23 | 15 | 12 |
| Example 55 | 1.78 | 0.45 | 0.59 | 16 | 14 |
| Example 56 | 1.96 | 0.49 | 0.65 | 14 | 15 |
| Example 57 | 1.85 | 0.31 | 0.37 | 7 | 7 |

TABLE 4

| Sample No. | Ceramic body Size mm | Constitutions of base electrode layer | | | | Content ratio of glass component | | Upper electrode layer Main component |
|---|---|---|---|---|---|---|---|---|
| | | Main compounds included in glass component | | | | Content ratio of ZnO (α/B1) | Content ratio of $B_2O_3$ (β/B2) | |
| | | ZnO | $B_2O_3$ | $SiO_2$ | $Al_2O_3$ | | | |
| Example 61 | 1.6 × 0.8 × 0.8 | Y | Y | Y | Y | 0.20 | 0.50 | Au |
| Example 62 | 1.6 × 0.8 × 0.8 | Y | Y | Y | Y | 0.35 | 0.80 | Au |
| Example 63 | 1.6 × 0.8 × 0.8 | Y | Y | Y | Y | 0.25 | 0.50 | Au |
| Example 64 | 1.6 × 0.8 × 0.8 | Y | Y | Y | Y | 0.32 | 0.75 | Au |
| Example 65 | 1.6 × 0.8 × 0.8 | Y | Y | Y | Y | 0.20 | 0.60 | Au |
| Example 66 | 1.6 × 0.8 × 0.8 | Y | Y | Y | Y | 0.35 | 0.60 | Au |
| Example 67 | 1.6 × 0.8 × 0.8 | Y | Y | Y | Y | 0.28 | 0.65 | Au |
| Example 68 | 2.0 × 1.2 × 1.2 | Y | Y | Y | Y | 0.30 | 0.70 | Au |
| Example 69 | 3.2 × 1.6 × 1.6 | Y | Y | Y | Y | 0.28 | 0.70 | Au |
| Example 70 | 4.5 × 3.2 × 2.0 | Y | Y | Y | Y | 0.32 | 0.65 | Au |

| Sample No. | Surface roughness of external electrode end part | | | Defective rate of heat shock test −55° C./200° C. % | Defective rate of high temperature life test 200° C - 1000 h % |
|---|---|---|---|---|---|
| | Base electrode layer Ra1 (μm) | Intermediate electrode layer Ra2 (μm) | Upper electrode layer Ra3 (μm) | | |
| Example 61 | 4.86 | 1.22 | 1.62 | 12 | 12 |
| Example 62 | 3.05 | 0.76 | 1.02 | 15 | 15 |
| Example 63 | 3.15 | 0.79 | 1.05 | 16 | 14 |
| Example 64 | 3.35 | 0.84 | 1.12 | 12 | 12 |
| Example 65 | 3.21 | 0.80 | 1.07 | 13 | 14 |
| Example 66 | 2.95 | 0.74 | 0.98 | 13 | 14 |
| Example 67 | 3.15 | 0.53 | 0.63 | 8 | 7 |
| Example 68 | 4.65 | 0.78 | 0.93 | 9 | 7 |

TABLE 4-continued

| | | | | | |
|---|---|---|---|---|---|
| Example 69 | 3.82 | 0.64 | 0.76 | 7 | 8 |
| Example 70 | 3.55 | 0.59 | 0.71 | 6 | 6 |

Table 3 shows evaluation results of Examples 31 to 57 in which the main component of the upper electrode layer 43 was Pd. First, when the evaluation results of Examples 31 to 40 shown in Table is compared, Example 39 and Example 40 had the defective rate of the heat shock test of 10% or less; and the defective rate of highly accelerated life test was 10% or less. That is, Example 39 and Example 40 had improved heat shock resistance and highly accelerated lifetime compared to other Examples 31 to 38. Examples 39 and 40 included all of zinc oxide, boron oxide, silicon oxide, and aluminum oxide in the glass component, further the content ratio of zinc oxide (α/B1) was within the range of 0.25 to 0.32, and a content ratio of boron oxide (β/B2) was within the range of 0.60 to 0.70.

Also, as shown in Table 3, in Examples 41 to 57, the size of the ceramic body 10 was varied and experiment was carried out. In Examples 41 to 57, as similar to above, Examples 45 to 46, 51 to 52, and 57 in which the content ratios of zinc oxide and boron oxide were within the predetermined range also had the defective rate of the heat shock test and the defective rate of the highly accelerated life test of both 10% or less. According to such result, by having a predetermined compound in a predetermined content ratio in the glass component constituting the base electrode layer 40, the heat shock resistance and the highly accelerated lifetime improved even more, and the mounting reliability improved even more.

Also, Table 4 shows the evaluation results of Examples 61 to 70 in which the main component of the upper electrode layer 43 was Au. As shown in Table 4, even when Au was used as the main component (Examples 61 to 70), the same tendencies as in case of using Pd as the main component (Examples 31 to 57) were confirmed, and by including a predetermined compound by a predetermined ratio in the glass component, the mounting reliability was improved even more.

Note that, Table 3 and Table 4 do not indicate the results of heat shock test, however the heat shock test of −55° C./150° C. was carried out in Examples 31 to 70 of Experiment 2. In Experiment 2, all of examples showed the defective rate of heat shock test of −55° C./150° C. of 0%.

Experiment 3

In Experiment 3, experiment was carried out by varying the content ratio of Ni included in the upper electrode layer 43, and capacitor samples according to Examples 81 to 93, were produced. Specifically, in Example 81 and Example 89, the upper electrode layer 43 was constituted by an alloy plating of Pd90-Ni10 (wt %) or Au90-Ni10 (wt %). Further, in Examples 82 to 88 and Examples 90 to 93, the content ratio of Ni of the upper electrode layer 43 which was a plating layer was lower than Examples 81 and 89. The experiment conditions other than this were same as Experiment 2, and the mounting reliability of the capacitor samples according to Examples 81 to 93 were evaluated as similar to Experiment 2.

Also, in Experiment 3, the content ratio of Ni at a surface layer of the upper electrode layer 43 was obtained by performing component analysis using TEM (transmission electron microscope)-EDX. A sample for TEM observation was produced by cutting a thin piece of an outermost surface of the upper electrode layer 43 which was an area about 200 nm in depth direction from the outermost surface by a microsampling method using a focused ion beam (FIB). The thin piece was cut from at least two or more places per one capacitor sample. Note that, the above-mentioned measurement was performed to 10 capacitor samples per each example, and the maximum value within the obtained analysis data was used as the content of Ni. The content of Ni of Examples 81 to 93 is shown in Table 5.

TABLE 5

| | | Constitutions of base electrode layer | | | | | | |
|---|---|---|---|---|---|---|---|---|
| | | | | | | Content ratio of glass component | | Upper |
| | Ceramic body Size | Main compounds included in glass component | | | | Content ration of ZnO | Content ratio of $B_2O_3$ | electrode layer Main |
| Sample No | mm | ZnO | $B_2O_3$ | $SiO_2$ | $Al_2O_3$ | (α/B1) | (β/B2) | component |
| Example 81 | 1.6 × 0.8 × 0.8 | Y | Y | Y | Y | 0.28 | 0.65 | Pd |
| Example 82 | 1.6 × 0.8 × 0.8 | Y | Y | Y | Y | 0.28 | 0.65 | Pd |
| Example 83 | 1.6 × 0.8 × 0.8 | Y | Y | Y | Y | 0.30 | 0.70 | Pd |
| Example 84 | 2.0 × 1.2 × 1.2 | Y | Y | Y | Y | 0.32 | 0.60 | Pd |
| Example 85 | 2.0 × 1.2 × 1.3 | Y | Y | Y | Y | 0.25 | 0.65 | Pd |
| Example 86 | 3.2 × 1.6 × 1.6 | Y | Y | Y | Y | 0.28 | 0.70 | Pd |
| Example 87 | 3.2 × 1.6 × 1.6 | Y | Y | Y | Y | 0.30 | 0.60 | Pd |
| Example 88 | 4.5 × 3.2 × 2.0 | Y | Y | Y | Y | 0.32 | 0.65 | Pd |
| Example 89 | 1.6 × 0.8 × 0.8 | Y | Y | Y | Y | 0.28 | 0.65 | Au |
| Example 90 | 1.6 × 0.8 × 0.8 | Y | Y | Y | Y | 0.28 | 0.65 | An |
| Example 91 | 2.0 × 1.2 × 1.2 | Y | Y | Y | Y | 0.30 | 0.70 | Au |
| Example 92 | 3.2 × 1.6 × 1.6 | Y | Y | Y | Y | 0.28 | 0.70 | Au |
| Example 93 | 4.5 × 3.2 × 2.0 | Y | Y | Y | Y | 0.32 | 0.65 | Au |

TABLE 5-continued

| Sample No | Upper electrode layer Ni content ratio at surface layer wt % | Surface roughness of external electrode end part Base electrode layer Ra1 (μm) | Surface roughness of external electrode end part Intermediate electrode layer Ra2 (μm) | Surface roughness of external electrode end part Upper electrode layer Ra3 (μm) | Defective rate of heat shock test −55° C./200° C. % | Defective rate of high temperature life test 200° C - 1000 h % |
|---|---|---|---|---|---|---|
| Example 81 | 10.0 | 2.30 | 0.38 | 0.46 | 6 | 6 |
| Example 82 | 5.0 | 2.20 | 0.37 | 0.44 | 3 | 4 |
| Example 83 | 2.5 | 3.10 | 0.52 | 0.62 | 3 | 2 |
| Example 84 | 1.0 | 2.20 | 0.37 | 0.44 | 2 | 3 |
| Example 85 | 0.0 | 4.65 | 0.78 | 0.93 | 1 | 1 |
| Example 86 | 0.0 | 2.30 | 0.38 | 0.46 | 0 | 0 |
| Example 87 | 0.0 | 4.05 | 0.81 | 0.81 | 0 | 1 |
| Example 88 | 5.0 | 1.85 | 0.37 | 0.37 | 5 | 5 |
| Example 89 | 10.0 | 3.15 | 0.53 | 0.63 | 8 | 7 |
| Example 90 | 2.5 | 3.30 | 0.55 | 0.66 | 3 | 2 |
| Example 91 | 0.0 | 4.40 | 0.73 | 0.88 | 1 | 4 |
| Example 92 | 0.0 | 3.65 | 0.61 | 0.73 | 0 | 0 |
| Example 93 | 0.0 | 3.75 | 0.75 | 0.75 | 0 | 1 |

As shown in Table 5, in all of Examples 81 to 93 of Experiment 3, the relationship of the surface roughness of each electrode layer satisfied 5.0 μm≥Ra1>Ra3≥Ra2. Also, in all of Examples 81 to 93 of Experiment 3, the content ratio of zinc oxide (α/B1) in the glass component was within the range of 0.25 to 0.32, and a content ratio of boron oxide (β/B2) in the glass component was within the range of 0.60 to 0.70. Therefore, in all of Examples 81 to 93 of Experiment 3, the defective rate of the heat shock test and the defective rate of the highly accelerated life test were both 10% or less; and also had a high mounting reliability.

Next, the content ratio of Ni at the surface layer of the upper electrode layer 43 is discussed. Next, when evaluation results of examples of Experiment 3 were compared, Examples 82 to 88 and 90 to 93 having small Ni content ratio had a lower defective rate for each test than Examples 81 and 89 having the Ni content ratio of 10 wt %. Specifically, the defective rate of heat shock test and the defective rate of highly accelerated life test of Examples 82 to 88 and 90 to 93 were both 5% or less. According to this result, it was confirmed that by having the Ni content ratio of 5 wt % or less at the surface of the upper electrode layer 43, the mounting reliability improved even more.

Note that, Table 6 shows the results of evaluation when the thickness Tu of the upper electrode layer 43 was varied. Examples 101 and 103 of Table 6 had Tu of 1.0 μm or less and correspond to Examples 3 and 13 of Experiment 1. Further, Examples 102 and 104 had the thickness Tu of 1.0 μm or more, and the constitutions of Examples 101 and 103 other than this were same as Examples 102 and 104.

As shown in Table 6, in Examples 102 and 104, the thickness Tu of the upper electrode layer 43 was thick as 1.0 μm or more, but the surface roughness of each electrode layer was controlled within the predetermined ranges, thus Examples 102 and 104 passed the heat shock test and the highly accelerated life test. Note that, Examples 101 and 103 having Tu of 1.0 μm or less which was thinner than Examples 102 and 104 having thick Tu had a lower defective rate of heat shock test and a lower defective rate of highly accelerated life test. As a result, it was confirmed that by having 1.0 μm or less of the thickness Tu of the upper electrode layer 43, the mounting reliability was improved even more.

TABLE 6

| | Constitution of base electrode layer | | | | | | | Upper electrode layer |
|---|---|---|---|---|---|---|---|---|
| | Main compounds included in glass component | | | | Content ratio of glass component | | | Ni content ratio at surface layer wt % |
| | | | | | Content ratio of ZnO | Content ratio of B₂O | | |
| Sample No. | ZnO | B₂O₃ | SiO₂ | Al₂O₃ | (α/B1) | (β/B2) | Main component | |
| Example 101 | Y | Y | Y | Y | 0.35 | 0.80 | Pd | 10.0 |
| Example 102 | Y | Y | Y | Y | 0.35 | 0.80 | Pd | 10.0 |
| Example 103 | Y | Y | Y | Y | 0.20 | 0.50 | Au | 10.0 |
| Example 104 | Y | Y | Y | Y | 0.20 | 0.50 | Au | 10.0 |

| Sample No. | Upper electrode layer Thickness Tu μm | Surface roughness of external electrode end part Base electrode layer Ra1 (μm) | Surface roughness of external electrode end part Intermediate electrode layer Ra2 (μm) | Surface roughness of external electrode end part Upper electrode layer Ra3 (μm) | Defective rate of heat shock test −55° C./200° C. % | Defective rate of high temperature life test 200° C. - 1000 h % |
|---|---|---|---|---|---|---|
| Example 101 | 0.3 | 5.00 | 1.25 | 1.67 | 12 | 15 |
| Example 102 | 2.1 | 5.00 | 1.20 | 1.70 | 16 | 17 |

TABLE 6-continued

| | | | | | | |
|---|---|---|---|---|---|---|
| Example 103 | 0.2 | 4.86 | 1.22 | 1.62 | 12 | 12 |
| Example 104 | 1.8 | 4.80 | 1.20 | 1.60 | 15 | 16 |

NUMERICAL REFERENCES

1 . . . Multilayer ceramic capacitor
2 . . . Ceramic layer
3 . . . Internal electrode layer
4 . . . External electrode
4a . . . External electrode end part (terminal electrode)
4b . . . External electrode extension part
4b2 . . . Elongated part
10 . . . Ceramic body
40 . . . Base electrode layer
41 . . . Intermediate electrode layer
43 . . . Upper electrode layer
50 . . . Mounting substrate
52 . . . Wiring pattern
54 . . . Conductive adhesive agent

What is claimed is:

1. A ceramic electronic device comprising:
a ceramic body having ceramic layers and internal electrode layers stacked in alternating manner; and
a terminal electrode formed at an end face of the ceramic body, the terminal electrode comprising:
a base electrode layer formed so to electrically connect with the internal electrode layers,
an intermediate electrode layer formed at an outer side of the base electrode layer, and
an upper electrode layer formed at an outer side of the intermediate electrode layer,
wherein the base electrode layer includes a metal component and a glass component,
the intermediate electrode layer includes Ni,
the upper electrode layer includes Pd or Au,
a surface roughness Ra1 of the base electrode layer in the terminal electrode is 5.0 μm or less,
the glass component included in the base electrode layer includes zinc oxide (ZnO), boron oxide ($B_2O_3$), silicon oxide ($SiO_2$), and aluminum oxide ($Al_2O_3$),
a ratio of content of zinc oxide with respect to a sum of contents of boron oxide, silicon oxide, and aluminum oxide ($ZnO/(B_2O_3+SiO_2+Al_2O_3)$) is 0.25 to 0.32 when the glass component as a whole is 100 parts by mol, and
a ratio of content of boron oxide with respect to a sum of contents of silicon oxide and aluminum oxide ($B_2O_3/(SiO_2+Al_2O_3)$) is 0.60 to 0.70 when the glass component as a whole is 100 parts by mol.

2. The ceramic electronic device according to claim 1, wherein the surface roughness Ra1 of the base electrode layer, a surface roughness Ra2 of the intermediate electrode layer, and a surface roughness Ra3 of the upper electrode layer satisfy a relationship of Ra1>Ra3≥Ra2.

3. The ceramic electronic device according to claim 1, wherein a thickness of the upper electrode layer in the terminal electrode is 1 μm or less.

4. The ceramic electronic device according to claim 1, wherein a content ratio of Ni is 5.0 wt % or less at a surface of the upper electrode layer.

5. A ceramic electronic device comprising:
a ceramic body having ceramic layers and internal electrode layers stacked in alternating manner; and
a terminal electrode formed at an end face of the ceramic body, the terminal electrode comprising:
a base electrode layer formed so to electrically connect with the internal electrode layers,
an intermediate electrode layer formed at an outer side of the base electrode layer, and
an upper electrode layer formed at an outer side of the intermediate electrode layer,
wherein the base electrode layer includes a metal component and a glass component,
the intermediate electrode layer includes Ni,
the upper electrode layer includes Pd or Au,
a surface roughness Ra1 of the base electrode layer in the terminal electrode is 7.0 μm or less, and
the surface roughness Ra1 of the base electrode layer, a surface roughness Ra2 of the intermediate electrode layer, and a surface roughness Ra3 of the upper electrode layer satisfy a relationship of Ra1>Ra3≥Ra2.

6. The ceramic electronic device according to claim 5, wherein a thickness of the upper electrode layer in the terminal electrode is 1 μm or less.

7. The ceramic electronic device according to claim 5, wherein the glass component included in the base electrode layer includes zinc oxide (ZnO), boron oxide ($B_2O_3$), silicon oxide ($SiO_2$), and aluminum oxide ($Al_2O_3$).

8. The ceramic electronic device according to claim 7, wherein a ratio of content of zinc oxide with respect to a sum of contents of boron oxide, silicon oxide, and aluminum oxide ($ZnO/(B_2O_3+SiO_2+Al_2O_3)$) is 0.25 to 0.32 when the glass component as a whole is 100 parts by mol, and
a ratio of content of boron oxide with respect to a sum of contents of silicon oxide and aluminum oxide ($B_2O_3/(SiO_2+Al_2O_3)$) is 0.60 to 0.70 when the glass component as a whole is 100 parts by mol.

9. The ceramic electronic device according to claim 5, wherein a content ratio of Ni is 5.0 wt % or less at a surface of the upper electrode layer.

10. The ceramic electronic device according to claim 8, wherein a content ratio of Ni is 5.0 wt % or less at a surface of the upper electrode layer.

* * * * *